Oct. 11, 1966   J. E. GLAUSER ETAL   3,277,738
CONTROL LINE REGULATOR
Filed Jan. 20, 1964   2 Sheets-Sheet 1
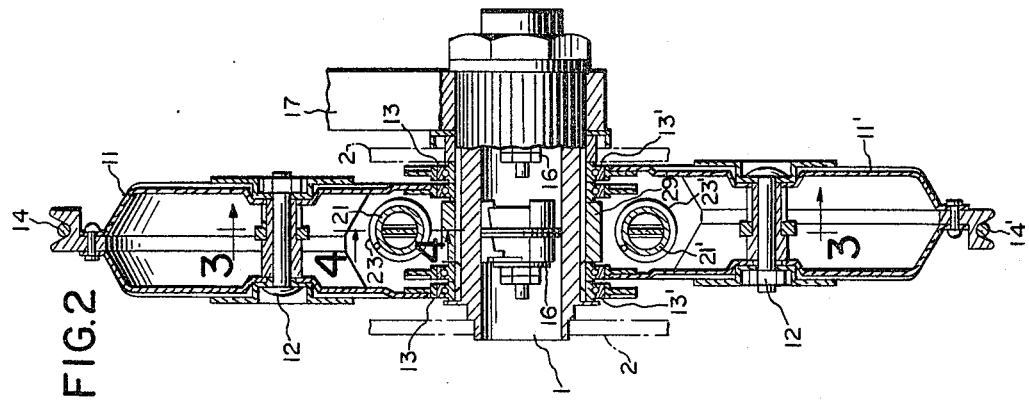
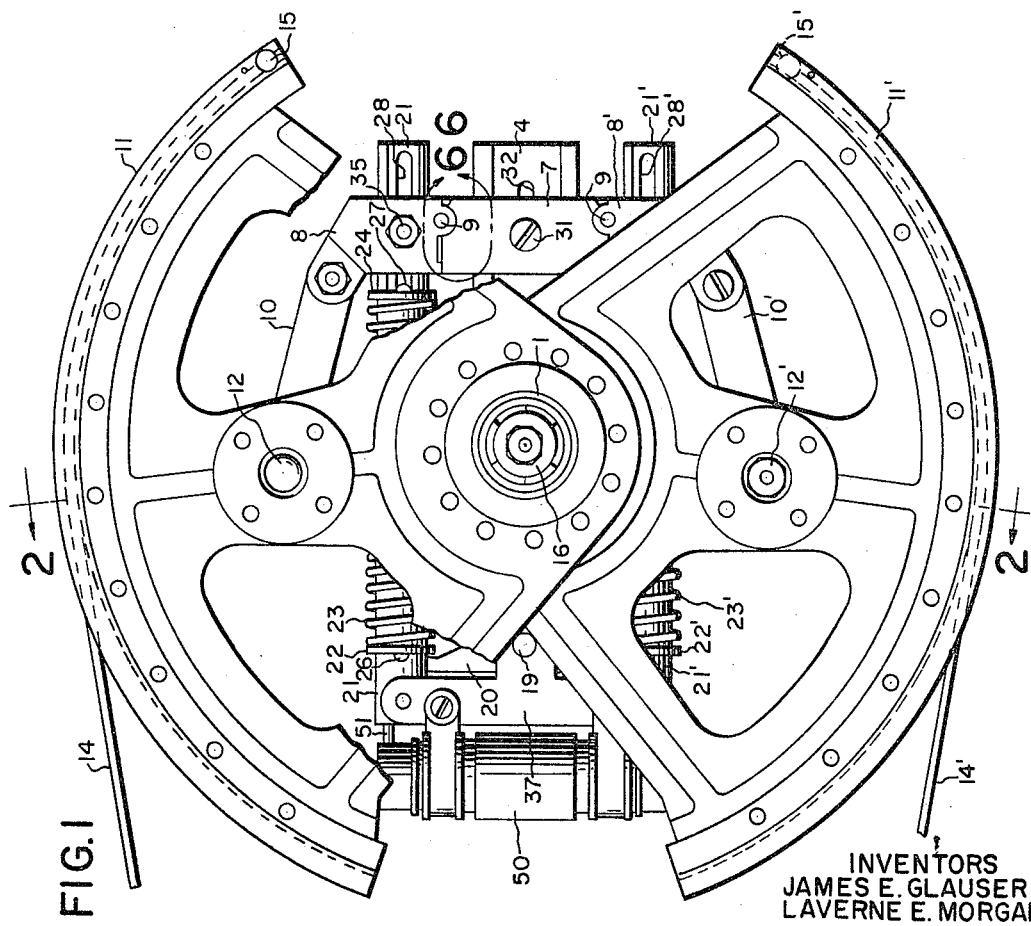
INVENTORS
JAMES E. GLAUSER
LAVERNE E. MORGAN
DON L. FRISK
BY Paul B. Hunter
ATTORNEY Oct. 11, 1966
J. E. GLAUSER ETAL
3,277,738
CONTROL LINE REGULATOR
Filed Jan. 20, 1964
2 Sheets-Sheet 2
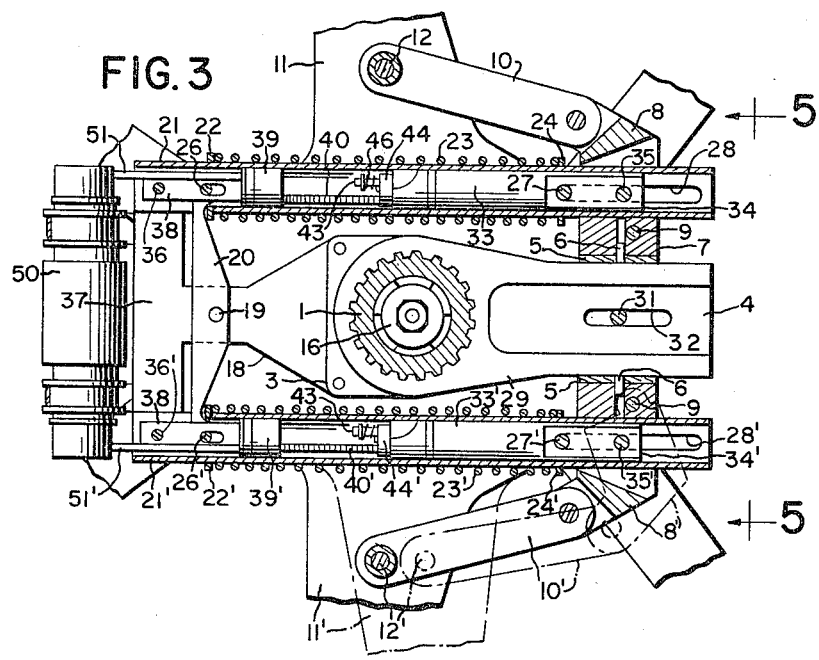
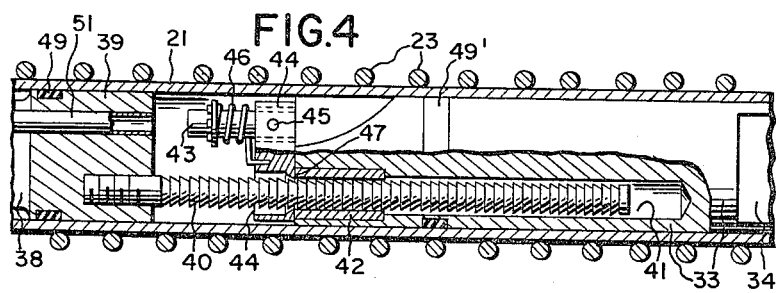
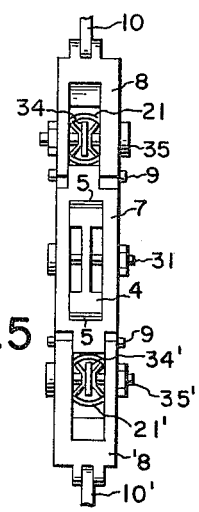
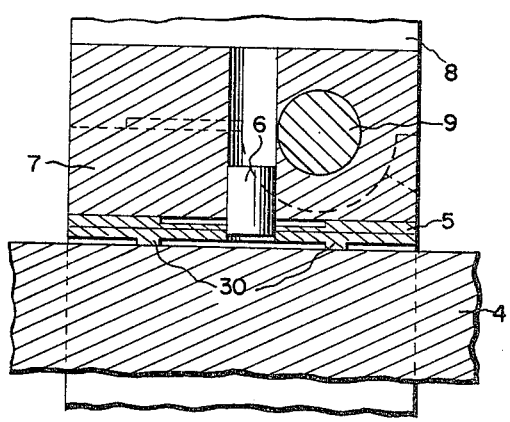
INVENTORS
JAMES E. GLAUSER
LAVERNE E. MORGAN
DON L. FRISK
BY Paul B. Hunter
ATTORNEY United States Patent Office 3,277,738
Patented Oct. 11, 1966

3,277,738
CONTROL LINE REGULATOR
James E. Glauser, Santa Ana, and La Verne E. Morgan and Don L. Frisk, Orange, Calif., assignors to Pacific Scientific Company, San Francisco, Calif., a corporation of California
Filed Jan. 20, 1964, Ser. No. 338,762
6 Claims. (Cl. 74—501.5)

This invention relates generally to a control line apparatus, and the invention has reference more particularly to a novel control line or tension regulator utilized for maintaining uniform tension in control lines extending between controlling and controlled points, as where operating a controlled surface, such as a rudder, elevator, or aileron of an airplane, from the control stick or steering wheel, the said regulator acting automatically to compensate for variations in the length of the control lines resulting from such conditions as temperature changes, airplane deflection and distortion, etc., the said regulator acting to automatically lock upon the application of a control movement thereto so as to prevent any mushiness in the controls during such control operation thereof.

Control line regulators have been used heretofore and consist generally of one or more compression or regulator springs which exert a tension on the control lines or cables equal to the desired rig load of the cable system, together with an automatically locking mechanism which, although it allows the regulator spring forces to be exerted on the cables so long as the cables are under neutral or balanced forces, i.e. when the tensions on the control cables are equal, thereby to maintain the desired rig loading, nevertheless it locks up immediately upon a control force being applied to one of the control cables. These control regulators as heretofore constructed have not been entirely satisfactory in use for several reasons, among which may be mentioned, firstly, in case a cable breaks, the controlled surface pulls hard over, or in case there is a valve inserted between the controlled surface and the regulator, the valve is pulled hard over, resulting in movement of the control surface to a dangerous extent which cannot be corrected manually and may result in a fatal accident; secondly, control regulators as heretofore constructed generally employ a cylindrical locking collar movable along a cylindrical driving arm, with the result that it is extremely difficult to determine the loading friction that can be exerted by the collar upon the driving arm in use, and where large frictional forces are desired there is a tendency for the collar to Brinell on the driving arm, resulting in distortion of the driving arm and uncertain operation; and thirdly, in these control cables heretofore used it often happens that the control force applied to one of the cables is great enough to cause such cable to stretch somewhat during the period the force is being applied, and this results in undesired slack being produced in the untensioned cable, resulting at times in the fouling of the control lines.

It is, therefore, the principal object of the present invention to overcome and correct the above recited defects of the prior art regulators and to provide a novel regulator that is fast acting, rugged and dependable in operation; and which maintains the control lines taut at all times, the said regulator serving in case a cable breaks to prevent the control from moving hard over, so that the craft can be maneuvered safely.

One feature of the present invention is to provide a novel control line regulator of the above character that incorporates a surge lock which serves to prevent the regulator from compensating large amounts in the event of failure of one side of the cable system, thereby enabling the pilot to operate the aircraft safely in such emergencies.

Another feature of the present invention is to provide a regulator of the above character that incorporates a novel slack take-up device that uses the main regulator springs for taking up slack in the untensioned cable during a control movement of the regulator, thereby eliminating separate slack take-up springs.

Still another feature of the present invention is to provide a novel driving arm having a relatively high cross-sectional moment of inertia and one providing flat surfaces upon which a cross-head having a cooperating flat surfaces may engage to thereby produce a locking or braking mechanism that is positive and reliable in action and which applies a desired predetermined amount of frictional engagement in use.

These and other features and advantages of the present invention will become more apparent after a perusal of the following specification taken in connection with the accompanying drawings wherein:

FIG. 1 is a side view with parts broken away showing the novel regulator of the present invention in use;

FIG. 2 is a partial sectional view taken along line 2—2 of FIG. 1;

FIG. 3 is a partial sectional side view taken along line 3—3 of FIG. 2;

FIG. 4 is a blown-up view of a portion of the surge lock structure shown in FIG. 3;

FIG. 5 is a view taken along 5—5 of FIG. 3; and

FIG. 6 is an enlarged sectional view of the structure shown along line 6—6 of FIG. 1.

Similar characters of reference are used in the above figures to designate corresponding parts.

Referring now to the figures, the reference numeral 1 designates a hollow regulator shaft that is turnably supported in a suitable bracket or other support 2 mounted in the air frame in a position convenient to the controlled surface. For example, a U-shaped bracket such as is disclosed in Patent No. 2,841,030 of R. J. Wrighton could be used for this purpose. The shaft 1 has a driving arm 17 splined thereon for driving the controlled member or surface. The shaft 1 carries a regulator body 3 having a hub 29 splined upon shaft 1. An extremely rigid connection is shown provided between the splined shaft 1 and the hub 29 and driven arm 17 by use of expansible members 16 mounted within shaft 1. Although the expansible members 16 are shown in this application for obtaining an extremely rigid connection between the hub 29 as well as arm 17 and the shaft 1, an ordinary splined or keyed connection could be used if desired.

The hub 29 of the regulator body is provided with a forwardly projecting cantilevered arm 4 that is of essentially rigid I-beam cross-section having flat hardened upper and lower bearing surfaces, upon which surfaces are slidably mounted braking shoes 5 (see especially FIG. 6), the shoes 5 on the upper and lower surfaces of the arm 4 being preferably also made of hardened material such as tool steel for reducing wear and Brinelling or marring the surface in use. The shoes 5 are mounted as by centrally located pins 6 projecting into apertures provided in a cross-head 7 of generally rectangular shape which surrounds the arm 4 and is longitudinally movable thereon. The shoes 5 are shown provided with spaced projected bearing portions 30 (see FIG. 6) located on opposite sides of the central pins 6 for engaging the arm 4 at predetermined spaced points. The cross-head 7 is retained on arm 4 by means of bolt 31 extending through a conforming aperture in the cross-head and through a slot 32 in arm 4, which slot limits the motion of the cross-head. The cross-head 7 is provided with upper and lower pivoted arms 8 and 8', which arms are pivoted upon pins 9 carried by the cross-head 7. The outer end portions of the pivoted arms 8, 8' are pivotally connected to links 10, 10' that in turn are pivotally connected by pins 12 and 12' to sheave sectors 11 and 11', which sectors are turnably mounted upon the shaft 1 as by means of bearings 13 and 13' which may be of antifriction type, if desired. Sectors 11 and 11' are adapted to have control cables 14 and 14' pass thereover with the forward ends of these cables attached to the sheave sectors at points 15 and 15'. The cross-head 7 and links 10 and 10' serve as force transmission means for transferring the force of rig load regulator springs 23 and 23' to sheave sectors 11 and 11' as will further appear.

The regulator body 3 is provided with an extension 18 extending oppositely from the arm 4, which extension has a reduced portion provided with a pivotal pin 19 upon which a cross-arm 20 is pivotally connected, the outer ends of this arm extending into longitudinal slots provided within spring guide tubes 21 and 21' and engage pins 26 and 26' which in turn engage washers 22 and 22' that abut the rear ends of rig load regulator compression springs 23 and 23' mounted on spring guide tubes 21 and 21' that extend forwardly above and below arm 4. The springs 23 and 23' are compressed between washers 22 and 22' and washers 24 and 24', which latter washers are slidably retained upon the guide tubes 21, 21' by means of pins 27, 27' movable in transverse actuating slots 28 and 28' provided in the forward end portions of tubes 21, 21'. These tubes are shown deformed inwardly at their forward end portions as illustrated in FIG. 5 and have bent tongues 34 and 34' projecting forwardly from movable or dynamic pistons 33 and 33' slidably mounted within guide tubes 21 and 21' and forming part of a surge locking means as will further appear. The pins 27 and 27' pass through conforming apertures within tongues 34 and 34' and hence serve to move pistons 33 and 33' as washers 24 and 24' slide along tubes 21 and 21' in use, as will further appear.

Transverse bolts 35 and 35' extend through conforming apertures in the pivoted arms 8 and 8' of cross-head 7 and also pass through slots 28 and 28' of tubes 21 and 21' and conforming apertures in tongues 34 and 34', whereby as regulator springs 23 and 23' expand and contract on tubes 21 and 21' spring washers 24 and 24' move along tubes 21 and 21', the bolts 35 and 35' serve to correspondingly move arms 8 and 8' which in turn acting through links 10 and 10' and sheave sectors 11 and 11' serve to wrap and unwrap cables 14 and 14' upon these sheave sectors.

The rear ends of spring guide tubes 21 and 21' are attached by pins 36 and 36' to a rear cross member 37 provided on the rear extension 18 of regulator body 3. The pins 36 and 36' also pass through conforming apertures provided in flat tongues 38 and 38' projecting rearwardly from stationary or static pistons 39 and 39' of the surge locking means mounted within tubes 21 and 21'. Static pistons 39 and 39' have ratchet shafts 40 and 40' fixedly inserted thereinto and extending forwardly and into cylindrical recesses 41 and 41' extending longitudinally within movable pistons 33 and 33'. Recesses 41 and 41' are provided with sleeve guides 42 for supporting and guiding rack members or ratchet shafts 40 and 40' within pistons 33 and 33'. Pistons 33 and 33' have rearwardly projecting pins 43 and 43' upon which are pivoted mounted locking pawls 44 and 44' by use of pivotal pins 45 and 45'. The pawls 44 and 44' have but limited turning movement upon pins 45 and 45' in use, and these pawls are normally held against pistons 33 and 33' by compression springs 46 and 46' mounted upon pins 43 and 43'. In the event that the pawls turn upon their pins 45 and 45'—for example, if the pawl 44 in FIG. 4 should swing clockwise against the tension of spring 46— the pawl tooth 47 will engage one of the teeth of ratchet shaft 40 preventing this shaft from being withdrawn from its position within the recess 41 of piston 33 should piston 33 start to accelerate toward the right as viewed in FIG. 4, thereby preventing such movement of piston 33; similarly, the locking pawl 44' would lock upon rigid shaft 40'. Stationary piston 39 and movable piston 33 are provided with ring packings or O-rings 49 and 49' which serve to retain dry gas between these pistons and surrounding the locking pawls 44 and 44' in use, such gas being supplied from a cylinder 50, under pressure, through tubes 51 and 51', thereby protecting the operation of the locking pawls 44 and 44' against external humidity changes. The pistons 39 and 33 and their associated apparatus co-operate during the operation of the regulator to prevent control system movement in the event a cable breaks accidently.

In operation, the rig or regulator compression springs 23 and 23' exert the desired loadings upon cables 14 and 14' by acting through cross-head 7, links 10 and 10', and sheave sectors 11 and 11', whereby desired rig loading of the cables is maintained in use so as to prevent sagging thereof or excessive tension therein. When a control regulating movement is applied to the cables 14 and 14', the tensioned cable, such as cable 14, will exert a greater force upon cross-head 7 than cable 14', whereby a very slight tilting of the cross-head 7 takes place about bolt 31, causing the braking shoes 5 to bind quickly and firmly upon the arm 4 and effect the turning of this arm and of the driven arm 17 connected to the control surface or other controlled member such as a propeller pitch control mechanism.

In the event that the control force is sufficient to cause cable 14' to become slack for example, then the regulator spring 23' associated with this cable will turn pivoted arm 8' forwardly (as shown in FIG. 3), thereby moving sector 11' forwardly or counter-clockwise as viewed in FIG. 1, to take up the slack occurring in cable 14', this action being illustrated in dot-dash lines in FIG. 3. Similarly, in the event that cable 14 becomes slack when a control force is applied to cable 14' the arm 8 will be pushed forward by spring 23 to take up the slack in cable 14. Thus, the novel regulator of this invention uses the regulator springs 23 and 23' not only for regulating the tensions in cable 14 and 24' during normal expansions and contractions of these cables due, for example, to temperature changes, deflection of the air frame, etc., but these springs also serve to remove slack from one cable during a control operation wherein the other cable is tensioned, so that these springs serve a dual function.

It will be noted that, since the arm 4 of the regulator body is of I-beam cross-section having flat upper and lower bearing surfaces which are hardened, and as the shoes 5 are also hardened, these shoes acting through their projections 30 act positively upon the arm 4 to obtain positive gripping and prevent the unintentional slipping of the cross-head 7 upon the arm 4 during a control operation of the regulator. Owing to the use of flat bearing surfaces of the shoes upon the arm 4 and owing to the hardened nature of these materials, there is no marring or Brinelling of the bearing surfaces of the arm 4, so that the regulator can be used for long periods of time without injury.

Heretofore, round collars have been used for locking, but their action is uncertain and they tend to Brinell or deform the tubular shafts heretofore used, resulting in shortened useful life thereof. Since the entire cable loading is taken in the arm 4 as a cantilever load, it is important that minimum possible deflection of this member take place, and the rigid nature of this arm prevents such deflection. A round cross-head shaft of equivalent stiffness would have to be much larger in diameter than the depth of arm 4, necessitating a thicker regulator, which is undesirable, as these regulators must be made as compact as possible to fit them into the airframe.

In the event that a cable such as cable 14 should break, which happens occasionally, it is important to prevent a control system movement which would tend to turn the controlled member hard over, which might result in destruction of the aircraft. The surge lock mechanism comprising pistons 33 and 39 and their associated equipment prevents such control system movement, by holding and locking the stored energy of the regulator springs 23 and 23′ before the system can operate. As soon as cable 14 breaks, spring 23 tends to move sector 11 clockwise with great rapidity, quickly accelerating from zero velocity. However, since the cross-head pivoted arm 8 turning on its pivot pin 9 tends to move forwardly under the action of spring 23 at high acceleration, the locking pawl 44 tends to remain stationary as piston 33 starts to move forwardly, as shown in FIG. 4, and pressing against the spring 46, serves to cause its pawl 47 to lock against the teeth of ratchet shaft 40 so that piston 33 is prevented from moving forwardly since the shaft 40 is locked to piston 39 which is held stationary upon the rear cross-head 37 of the regulator body 3. Thus, substantially the full rig tension of spring 23 opposes the rig tension of spring 23′ so that body 3 and hence arm 17 is not turned appreciably. The acceleration at which the device will work depends upon the adjustment of compression spring 46. The driving arm 17 is thus prevented from being turned hard over, so that the operator can control his craft and prevent its destruction. In practice, the movement of the control arm 17 is limited to a few degrees more or less. This slight amount of rotation of the driving arm 17 causes it to remain almost the same as it was before the cable 14 broke. The pilot is thus given an opportunity to initiate action to survive the emergency.

During normal operations of the regulator, in correcting for expansion and contraction of the cables, the rigid shafts 40 and 40′ will move in and out of recess 41. Also, when the cable 14 is restored after breaking, the pressure on pawl 44 will be released, so that this pawl will fall back into its position shown in FIG. 4 and allow movement of rigid shaft 40 into and out of recess 41, thus not interfering with the normal regulating action of the regulator. Similarly, if cable 14′ associated with sector sheave 11′ should break, the surge lock 33′–40′ will act similarly to prevent hard over movement of the controlled member.

Thus it will be seen that the novel regulator of the present invention not only takes care of the normal regulation of the control cables, but also provides a reliable and positive locking action upon the control movement; in addition, in the event that the cable becomes slack during a control movement, its associated rig load spring will act through the corresponding pivotal arm 8 or 8′ to take up such slack. Further, if a cable should break, the controlled member is prevented from being turned hard over by the action of the surge locks, as above explained, so that the novel regulator of this invention incorporates important safety features heretofore not possible in regulators.

Since many changes could be made in the above construction of the novel control line regulator of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control line regulator comprising a regulator shaft, a driven member connected to said shaft to be driven by the latter, a pair of oppositely disposed sheave sectors turnably mounted on said shaft and adapted to receive control cables, a regulator body fixed upon said shaft, said regulator body having a forwardly extending arm, a cross-head movable along said forwardly extending arm, arms pivotally connected to the end portions of said cross-head, links respectively connecting said pivoted arms to said respective sheave sectors, and a pair of regulator compensating springs carried by said regulator body and acting respectively on said pivoted arms for causing the latter to actuate said sheave sectors through said links to turn in opposite directions to maintain said cables under rig tension, said cross-head comprising locking means acting upon said regulator body arm to effect the locking of said sheave sectors against said relative turning movement when a control load is applied to one of the cables connected to one of said sheave sectors, the regulator compression spring of the other sheave sector acting through the pivoted arm connected to such sector to turn the latter to take up any slack developed in the other control cable as a result of said control movement.

2. A control line regulator as defined in claim 1 wherein the forwardly extending arm of said regulator body carrying said cross-head is a rigid cantilever member having hardened flat bearing surfaces on its opposite sides, said cross-head having shoes provided with mutually spaced hardened projections with flat bearing surfaces for engaging the flat opposite sides of said cantilever member, said shoes coacting with the bearing surfaces of said member to prevent relative turning of said sheaves during a control operation while permitting any necessary compensating action of said regulator to take place.

3. A control line regulator as defined in claim 1, including surge locking means, said latter means comprising acceleration responsive inertia means connected to said sheave sectors through said pivoted arms and said links and normally driven thereby in synchronism therewith, rack means cooperating with said inertia means, the breaking of a cable connected to a sheave sector resulting in sudden expansion of its connected regulator spring causing said inertia means to lock against said rack means to stop relative turning of said sectors and prevent a hard over movement of said regulator.

4. A control line regulator as defined in claim 3 wherein said regulator rig load compression springs have corresponding inner ends connected to said regulator body and their other ends connected to said pivoted cross head arms, and spring guide tubes connected to said regulator body and extending within said compression springs for supporting the latter, said surge locking means being contained within said spring guide tubes.

5. A control line regulator as defined in claim 4 comprising a static piston fixed within each of said guide tubes and a dynamic piston movable within each of said guide tubes and connected to a respective pivoted cross-head arm, each static piston having rack means thereon and each dynamic piston carrying said inertia means thereon for engaging said rack member to lock said dynamic piston against movement in the event of the breaking of a control cable.

6. A control line regulator comprising a shaft, an arm fixed on said shaft for driving a controlled member, a regulator body fixed on said shaft, a pair of compensating springs carried by said regulator body, a pair of sheave sectors rotatable on said shaft for connection to a pair of control cables, said regulator body having a bearing extension, a cross-head having slide bearings mounted on said body bearing extension, linkage connecting the ends of said cross-head to said sheave sectors respectively, pivoted inertia acceleration responsive members connected to said linkage to be actuated by the latter in response to movement of said sectors, rack members carried by said regulator body and cooperating with said inertia members, the breaking of a control cable resulting in the sudden expansion of its connected compensating spring, causing the linkage connected to the sector of such cable to actuate its connected inertia member with sufficient acceleration to effect the engagement of such inertia member with its cooperating rack member in locking relation, thereby preventing relative turning of said sectors and hard over movement of the connected controlled member.

References Cited by the Examiner

UNITED STATES PATENTS

| | | | |
|---|---|---|---|
| 969,443 | 9/1910 | Ballard et al. | 188—67 |
| 2,041,065 | 5/1936 | Hemphill | 188—67 X |
| 2,298,611 | 10/1942 | Bruderlin | 74—501.5 X |
| 2,363,228 | 11/1944 | Cade | 74—501.5 |
| 2,499,993 | 3/1950 | Gregg | 188—67 X |
| 2,753,584 | 7/1956 | Oishei. | |
| 2,787,916 | 4/1957 | Cushman | 74—501.5 |
| 2,841,030 | 7/1958 | Wrighton | 74—501.5 |
| 2,860,363 | 11/1958 | Howard et al. | 74—501.5 X |
| 3,180,176 | 4/1965 | De Maagd et al. | 74—501.5 |

FRED C. MATTERN, JR., *Primary Examiner.*

BROUGHTON G. DURHAM, *Examiner.*

C. F. GREEN, *Assistant Examiner.*